US011125312B2

United States Patent
Marsh et al.

(10) Patent No.: US 11,125,312 B2
(45) Date of Patent: Sep. 21, 2021

(54) AXLE ASSEMBLY

(71) Applicant: American Axle & Manufacturing, Inc., Detroit, MI (US)

(72) Inventors: Gregory A. Marsh, Ferndale, MI (US); Matthew T. Blakeman, South Rockwood, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 524 days.

(21) Appl. No.: 15/980,828

(22) Filed: May 16, 2018

(65) Prior Publication Data

US 2018/0259049 A1 Sep. 13, 2018

Related U.S. Application Data

(63) Continuation of application No. PCT/US2016/066156, filed on Dec. 12, 2016.

(60) Provisional application No. 62/267,308, filed on Dec. 15, 2015.

(51) Int. Cl.

| F16H 48/00 | (2012.01) |
|---|---|
| F16H 48/24 | (2006.01) |
| F16H 48/40 | (2012.01) |
| F16H 57/021 | (2012.01) |
| B60K 17/16 | (2006.01) |
| F16H 57/02 | (2012.01) |
| F16H 48/10 | (2012.01) |
| F16H 48/34 | (2012.01) |
| F16H 57/037 | (2012.01) |

(Continued)

(52) U.S. Cl.

CPC ............. *F16H 48/24* (2013.01); *B60K 17/16* (2013.01); *B60K 17/165* (2013.01); *B60K 17/20* (2013.01); *F16H 48/10* (2013.01); *F16H 48/34* (2013.01); *F16H 48/40* (2013.01); *F16H 57/02* (2013.01); *F16H 57/021* (2013.01); *F16H 57/037* (2013.01); *B60Y 2410/10* (2013.01); *F16H 48/06* (2013.01); *F16H 48/38* (2013.01); *F16H 2048/346* (2013.01); *F16H 2048/405* (2013.01)

(58) Field of Classification Search

CPC .......... F16H 48/06; F16H 48/10; F16H 48/34; F16H 48/38; F16H 48/40; F16H 48/20; F16H 48/24; F16H 48/2048; F16H 48/346; F16H 48/405; F16H 48/201

See application file for complete search history.

(56) References Cited

U.S. PATENT DOCUMENTS

| 3,394,610 A * | 7/1968 | Szodfridt .............. F16H 57/032 74/402 |
|---|---|---|
| 4,301,886 A | 11/1981 | Kinoshita et al. |
| 5,171,192 A | 12/1992 | Schlosser et al. |

(Continued)

FOREIGN PATENT DOCUMENTS

CN        2141776 Y       9/1993

OTHER PUBLICATIONS

PCT International Search Report dated Apr. 25, 2017 for corresponding PCT application No. PCT/US2016/066156, filed Dec. 12, 2016.

*Primary Examiner* — Charles A Fox
*Assistant Examiner* — Ryan P Dodd
(74) *Attorney, Agent, or Firm* — Burris Law, PLLC (57) ABSTRACT

Various improvements to axle assemblies are disclosed herein that are especially adapted for highly robust and compact configurations for use in front (i.e., steering) axle configurations.

13 Claims, 10 Drawing Sheets

(51) Int. Cl.
*F16H 48/38* (2012.01)
*F16H 48/06* (2006.01)

(56) References Cited

U.S. PATENT DOCUMENTS

| | | | |
|---|---|---|---|
| 6,322,157 | B1 | 11/2001 | DeWald et al. |
| 8,534,925 | B1 | 9/2013 | Stambek |
| 9,022,892 | B1 * | 5/2015 | Marsh, Jr. ............... F16H 48/06 |
| | | | 475/228 |
| 9,259,967 | B2 | 2/2016 | Marsh et al. |
| 2005/0096173 | A1 | 5/2005 | Allmandinger et al. |
| 2011/0136612 | A1 | 6/2011 | Zink |
| 2015/0306909 | A1 | 10/2015 | Marsh et al. |
| 2017/0043663 | A1 * | 2/2017 | Downs ................... F16D 13/58 |

\* cited by examiner

AXLE ASSEMBLY

CROSS-REFERENCE TO RELATED APPLICATIONS

This application is a bypass continuation application of International Patent Application No. PCT/US2016/066156 filed Dec. 12, 2016, which claims the benefit of U.S. Provisional Patent Application No. 62/267,308 filed Dec. 15, 2015. The disclosure of each of the above-referenced patent applications is incorporated by reference as if fully set forth in detail herein.

FIELD

The present disclosure relates to an axle assembly.

BACKGROUND

This section provides background information related to the present disclosure which is not necessarily prior art.

Commonly assigned U.S. Pat. No. 7,534,187 discloses an axle assembly having an electronically locking differential. Configuration of the axle assembly in this manner can pose certain problems when it is adapted to the front axle assembly of a heavy-duty vehicle where the torque that is to be transmitted through the differential assembly is relatively high and there is relatively little space to package the differential assembly. To provide sufficient torque transmitting capability, it may be necessary to employ three or more differential (bevel) pinions that mating engage both of the differential (bevel) side gears. This would tend to increase the size of the differential assembly, which may not be desirable if the packaging space of the vehicle is relatively limited. Accordingly, there remains a need in the art for an improved axle assembly.

SUMMARY

This section provides a general summary of the disclosure, and is not a comprehensive disclosure of its full scope or all of its features.

In one form, the present teachings provide an axle assembly that includes a differential assembly, an axle housing, a pair of differential bearings and a pair of bearing adjusters. The differential assembly having a differential case that defines a pair of bearing bores. The axle housing having a carrier structure and a cover. The carrier structure is a single, integrally and unitarily formed component having a carrier portion, a first axle tube portion and a second axle tube portion. The carrier portion defines a cover flange, a differential cavity and an opening through the cover flange that intersects the differential cavity. The opening is sized to receive the differential assembly there through. The differential is received in the differential cavity. The first axle tube portion extends laterally from a first side of the carrier portion and has a first shaft cavity that intersects the differential cavity. The second axle tube portion extends laterally from a second side of the carrier portion that is opposite the first side of the carrier portion. The second axle tube portion has a second shaft cavity that intersects the differential cavity. The cover is coupled to the carrier structure to at least substantially close the opening. Each of the differential bearings is received into a corresponding one of the bearing bores formed in the differential case. Each of the bearing adjusters is threadably coupled to an associated threaded segment on the carrier portion and engages an associated one of the differential bearings on a side opposite the differential carrier. The carrier portion extends laterally between the threaded segments. At least one of the first and second axle tube portions has a length that his greater than twice a length of the carrier portion.

According to a further embodiment of the invention, the carrier structure defines a lock aperture, and wherein the axle assembly further comprises an adjuster lock that is received into the lock aperture, the adjuster lock being engaged to one of the bearing adjusters and inhibiting rotation of the one of the bearing adjusters relative to the housing. Optionally, the lock aperture is formed in the cover flange and wherein the cover retains the adjuster lock in the lock aperture.

According to a further embodiment of the invention, a gusset extends between the carrier portion and the first axle tube portion.

According to a further embodiment of the invention, the differential assembly has a pair of output members, and wherein the differential assembly is operable in a first mode, which permits relative rotation between each of the output members and the differential case, and a second mode that inhibits relative rotation between the output members and the differential case.

According to a further embodiment of the invention, the differential assembly has a differential gearset and wherein the differential gearset that comprises a pair of helical side gears and a plurality of pinion pairs, each of the pinion pairs having a first helical pinon and a second helical pinion.

In another form, the present teachings provide an axle assembly that includes a housing and a locking differential assembly. The locking differential assembly has a differential case, a helical gearset and a locking mechanism. The differential case is mounted in the housing for rotation about an axis and defines a plurality of pinion bores. The helical gearset includes first and second helical side gears and a plurality of helical pinions. The first and second helical side gears are rotatable about the axis. The helical pinions are received in the pinion bores and transmit rotary power between the differential case and the first and second helical side gears. The locking mechanism has first and second clutch dogs and a plurality of return springs. The first clutch dog is fixed to the first side gear for rotation therewith. The second clutch dog is non-rotatably but axially slidably coupled to the differential case and movable between a first position, in which the first and second clutch dogs are engaged to one another to inhibit relative rotation between the first helical side gear and the differential case, and a second position in which the first and second clutch dogs are separated axially along the axis to permit relative rotation between the first helical side gear and the differential case. Each of the return springs is received in the differential case and is disposed between the second clutch dog and an associated one of the helical pinion gears. The return springs cooperate to bias the second clutch dog toward the second position.

According to a further embodiment of the invention, the helical pinion gears include a plurality of pinion gear sets. Each of the pinion bores houses an associated one of the pinion gear sets. Each of the pinion gear sets has a first helical pinion, which is meshingly engaged to the first helical side gear, and a second helical pinion that is meshingly engaged to the second side gear. The first and second helical pinions of each pinion gear set are meshingly engaged. The return springs are disposed between the second clutch dog and the first helical pinion gears. Optionally, each of the second helical pinion gears includes a gear member and a brake shoe and the brake shoe is mounted on the gear and received in an associated one of the pinion bores. Also optionally, each of the return springs is received through an associated one of the brake shoes.

According to a further embodiment of the invention, the first clutch dog defines a plurality of teeth that are spaced circumferentially apart about the axis. Each of the teeth has a root and is formed with a feature that is configured to reduce stress at the root. Optionally, the feature includes a groove that is formed centrally on an associated one of the teeth in a circumferential direction. The groove extends from a radially inward point on the associated one of the teeth and through an outer circumferential end of the associated one of the teeth.

In a further form, the present teachings provide an axle assembly that includes an axle housing, a locking differential assembly, and one or more guide pins. The locking differential assembly is received in the axle housing and has a differential input member, first and second differential output members, first and second clutch dogs, at least one return spring, a movable member, a clutch fork and a linear motor. The differential input member and the first and second differential output members are rotatable about a rotary axis. The first clutch dog is coupled to the second differential output member for rotation therewith. The second clutch dog is non-rotatably but axially slidably coupled to the differential input member. The second clutch dog is movable between a first position, in which the first and second clutch dogs are engaged to one another to thereby inhibit relative rotation between the differential input member and the second differential output member, and a second position in which the first and second clutch dogs are disengaged from one another to thereby permit relative rotation between the differential input member and the second differential output member. The at least one return spring biases the second clutch dog toward the second position. The movable member defines a clutch fork groove and is movable between a third position, which physically positions the second clutch dog in the first position, and a fourth position, which permits the second clutch dog to be moved by the at least one return spring into the second position. The clutch fork is received in the clutch fork groove and is pivotable about the rotary axis. The linear motor is coupled to the axle housing and has a motor output member that engages the clutch fork but which is not fixedly coupled to the clutch fork. The one or more guide pins are coupled to the axle housing and engage the clutch fork. The one or more guide pin are configured to guide the clutch fork along a desired path of movement that is parallel to the rotary axis.

According to a further embodiment of the invention, the one or more guide pins are threadably coupled to the axle housing.

According to a further embodiment of the invention, first and second guide pins are disposed along guide pin axes that are parallel to the desired path of movement and the motor output of the linear motor contacts the clutch fork at a location that is disposed between the guide pin axes.

According to a further embodiment of the invention, the linear motor includes a compliance spring and an intermediate output member. The compliance spring permits movement of the intermediate output member relative to the motor output.

In still another form, the present teachings provide a method for assembling an axle assembly. The method includes: providing an axle housing that defines a differential cavity and an aperture that intersects the differential cavity; securing a linear motor to the axle housing to close the aperture, the linear motor having a motor output member; installing a locking differential assembly into the differential cavity, the locking differential assembly having a differential input member, first and second differential output members, first and second clutch dogs, at least one return spring, a movable member and a clutch fork, the differential input member and the first and second differential output members being rotatable about a rotary axis, the first clutch dog being coupled to the second differential output member for rotation therewith, the second clutch dog being non-rotatably but axially slidably coupled to the differential input member, the second clutch dog being movable between a first position, in which the first and second clutch dogs are engaged to one another to thereby inhibit relative rotation between the differential input member and the second differential output member, and a second position in which the first and second clutch dogs are disengaged from one another to thereby permit relative rotation between the differential input member and the second differential output member, the at least one return spring biasing the second clutch dog toward the second position, the movable member defining a clutch fork groove and being movable between a third position, which physically positions the second clutch dog in the first position, and a fourth position, which permits the second clutch dog to be moved by the at least one return spring into the second position, the clutch fork being received in the clutch fork groove such that the clutch fork is pivotable about the rotary axis, the clutch fork abutting but not being fixedly coupled to the clutch fork; and installing at least one guide pin to the axle housing, the at least one guide pin engaging the clutch fork and being configured to guide the clutch fork along a desired path of movement that is parallel to the rotary axis.

According to a further embodiment of the invention, the at least one guide pin includes first and second guide pins that are disposed along guide pin axes that are parallel to the desired path of movement. The motor output of the linear motor contacts the clutch fork at a location that is disposed between the guide pin axes.

In another form, the present teachings provide a front axle assembly that includes an axle housing, a locking differential assembly and an electrically operated linear motor. The locking differential assembly is received in the axle housing. The locking differential assembly has a differential case, a helical gearset, which is received in the differential case, and first and second clutch dogs. The differential case defines a plurality of pinion bores. The helical gearset has first and second helical side gears and a plurality of pinion sets. Each of the pinion sets is received in an associated one of the pinion bores and has a first helical pinion, which is meshingly engaged to the first helical side gear, and a second helical pinion that is meshingly engaged with the second helical side gear. The first and second helical pinions of each pinion set are meshingly engaged to one another. The first clutch dog is coupled to the second helical side gear for rotation therewith. The second clutch dog is non-rotatably but axially movably coupled to the differential case. The second clutch dog is movable between a first position, in which the first and second clutch dogs are engaged to one another to thereby inhibit relative rotation between the second helical side gear and the differential case, and a second position in which the second clutch dog is disengaged from the first clutch dog to thereby permit relative rotation between the second helical side gear and the differential case. The electrically operated linear motor is coupled to the axle housing and has a motor output member that is selectively movable to urge the second clutch dog toward the first position.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
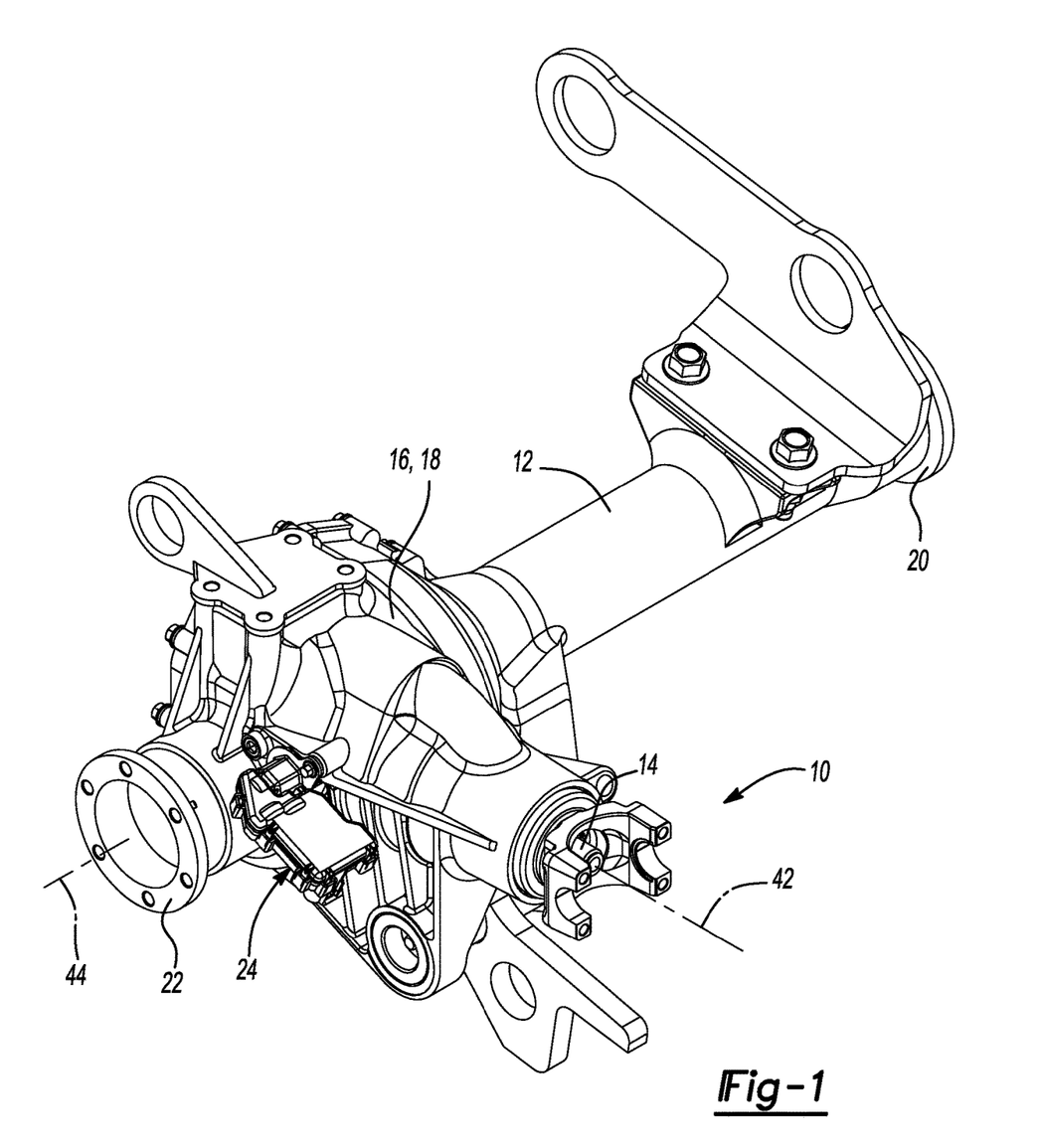
FIG. 1 is a perspective view of an exemplary axle assembly constructed in accordance with the teachings of the present disclosure.
Figure 2:
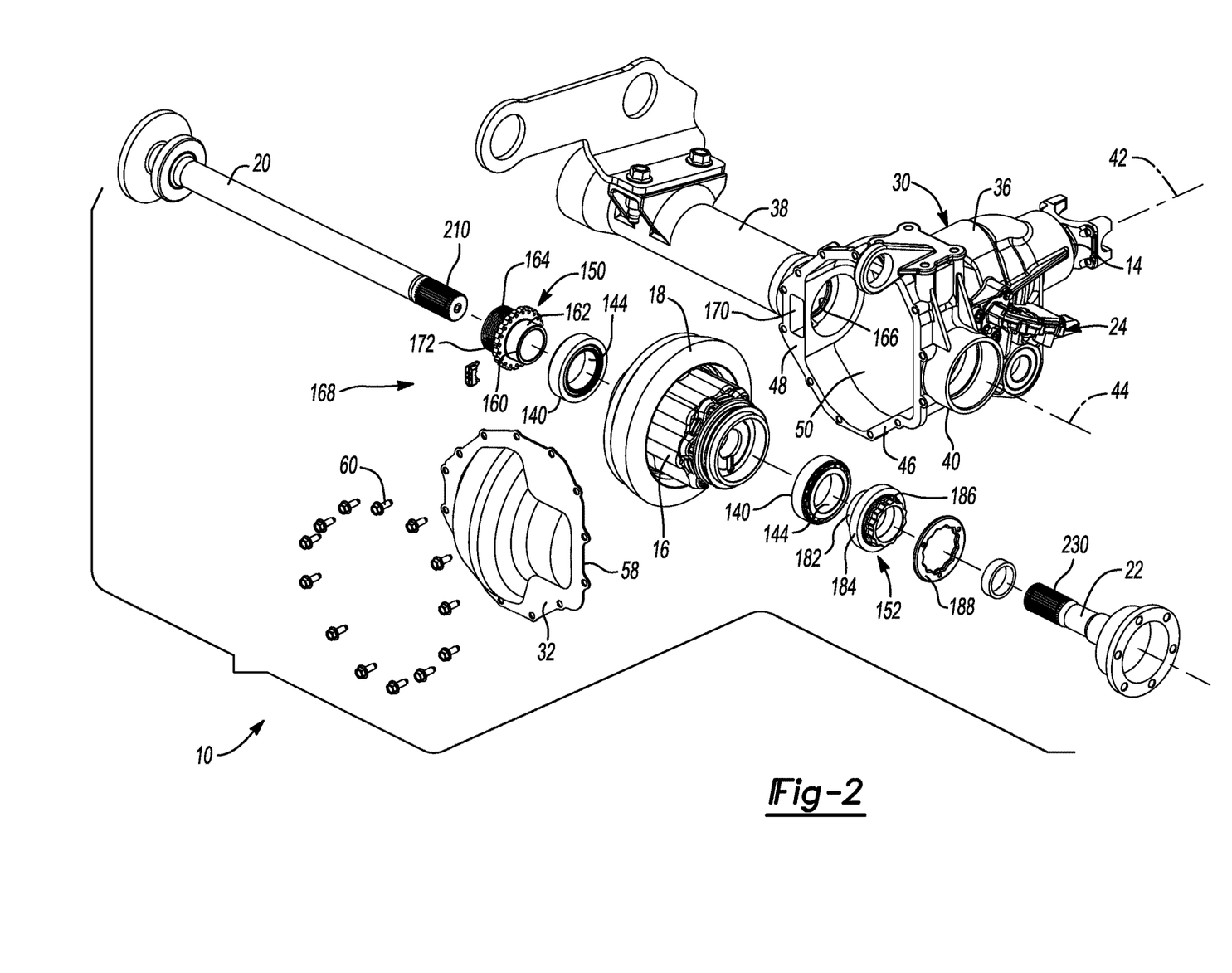
FIG. 2 is an exploded perspective view of the axle assembly of FIG. 1.

With reference to FIGS. 1 and 2, an axle assembly constructed in accordance with the teachings of the present disclosure is generally indicated by reference numeral 10. While the particular axle assembly illustrated and described in this disclosure is a front axle assembly, it will be appreciated that the teachings of the present disclosure have application to other types of axle assemblies, including rear axle assemblies. The axle assembly 10 can include a housing assembly 12, an input pinion 14, a differential assembly 16, a ring gear 18, first and second axle shafts 20 and 22, respectively, and a differential locking mechanism 24.

Figure 3:
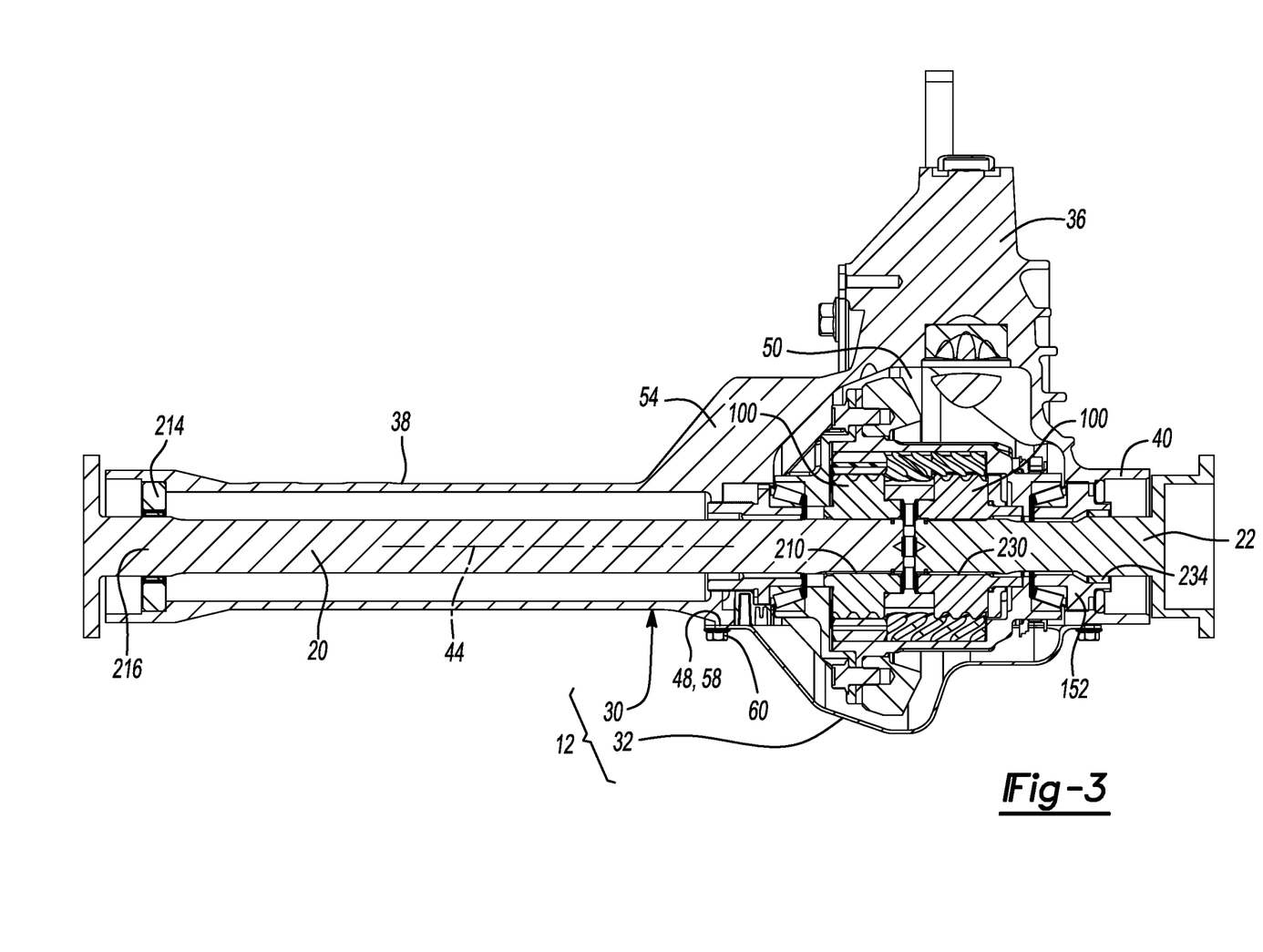
FIG. 3 is a longitudinal section view of the axle assembly of FIG. 1.
Figure 4:
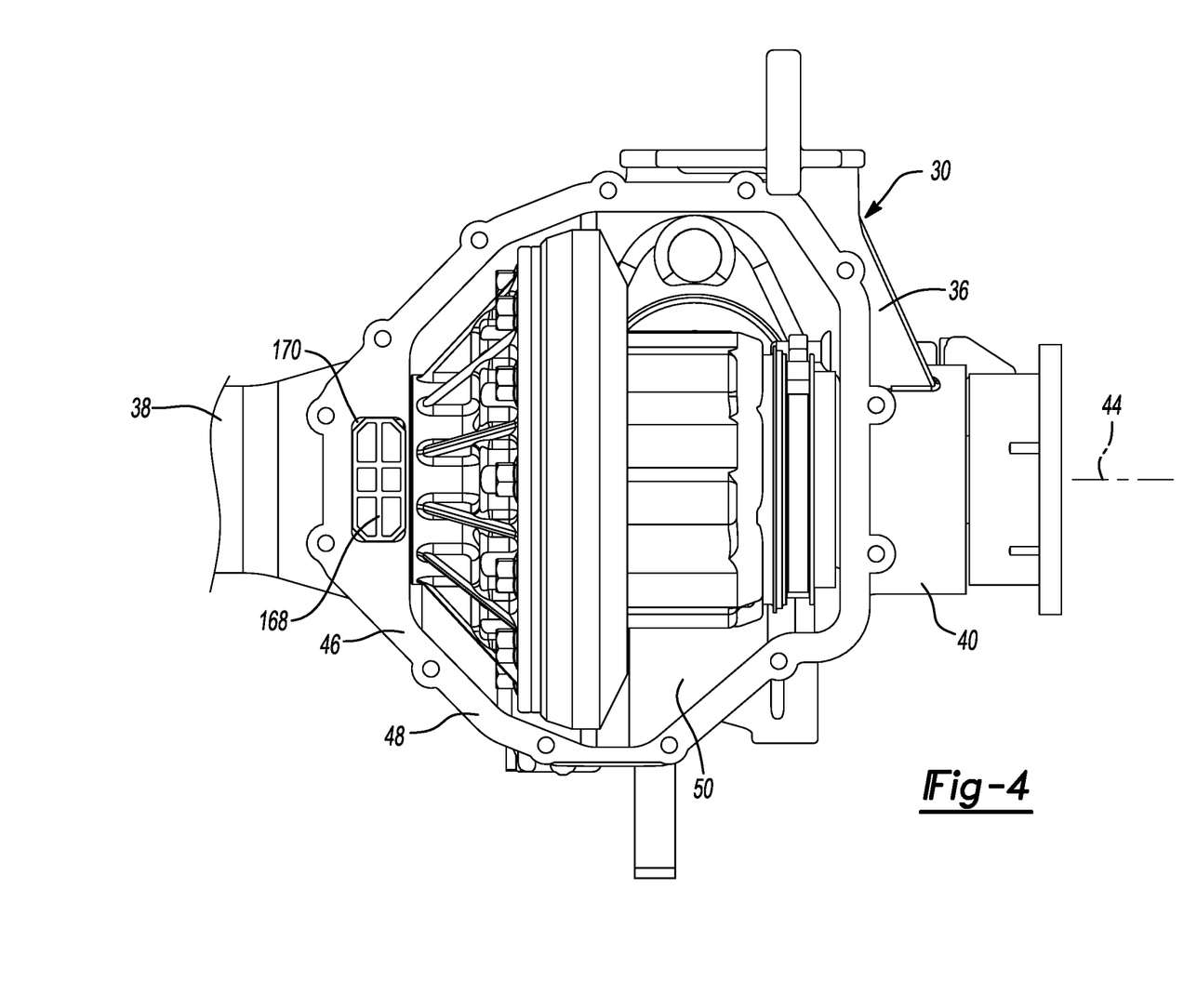
FIG. 4 is a rear elevation view of a portion of the axle assembly of FIG. 1.

With reference to FIGS. 2 through 4, the housing assembly 12 can include a carrier structure 30 and a cover 32. The carrier structure 30 can include a carrier portion 36 and first and second axle tube portions 38 and 40, respectively. The carrier portion 36 can be configured in a conventional manner to house the input pinion 14, which can be disposed for rotation about a first axis 42, and the differential assembly 16, which can be disposed for rotation about a second axis 44. The carrier portion 36 can define a cover flange 46 that terminates in a machined, planar surface 48. The cover flange 46 can form a perimeter of a cavity 50 in the carrier portion 36 that is sized to receive and support the differential assembly 16. The first and second axle tube portions 38 and 40 can be assembled to the carrier portion 36 in a manner that is employed in a conventional Salisbury-type axle housing. In the particular example provided, the first and second axle tube portions 38 and 40 are integrally and unitarily formed with the carrier portion 36 such that the carrier structure 30 is a single, unitarily and integrally formed component. The first and second axle tube portions 38 and 40 can be disposed longitudinally along the second axis 44 and can receive therein the first and second axle shafts 20 and 22, respectively, for rotation about the second axis 44. In the particular example illustrated, the first axle tube portion 38 extends longitudinally along the second axis 44 by an amount that is larger than twice the overall length of the differential assembly 16 and is significantly longer (along the second axis 44) than the second axle tube portion 40. A gusset 54 can be formed into the carrier structure 30 and can link the carrier portion 36 to the first axle tube portion 38. The gusset 54 can be formed on a side of the carrier structure 30 opposite the cover flange 46 and can not only be configured to resist bending of the first axle tube portion 38 toward and away from the first axis 42, but can also be configured to strengthen the carrier portion 36 in a region where loads are generated by meshing engagement between the input pinion 14 and the ring gear 18 when the ring gear 18 is driven in a predetermined rotational direction. The cover 32 can be coupled to the carrier structure 30 to close the cavity 50 in the carrier portion 36. In the example provided, a gasket (not shown) is disposed against a planar cover surface 58 defined by the cover 32 and the planar surface 48 of the cover flange 46 and a plurality of threaded fasteners 60 are received through holes in the cover 32 and threadably engaged to threaded holes in the cover flange 46.

The input pinion 14 can be conventional in its construction and can be mounted in the carrier structure 30 for rotation about the first axis 42. The input pinion 14 can be any type of bevel gear, including a hypoid gear.

Figure 5:
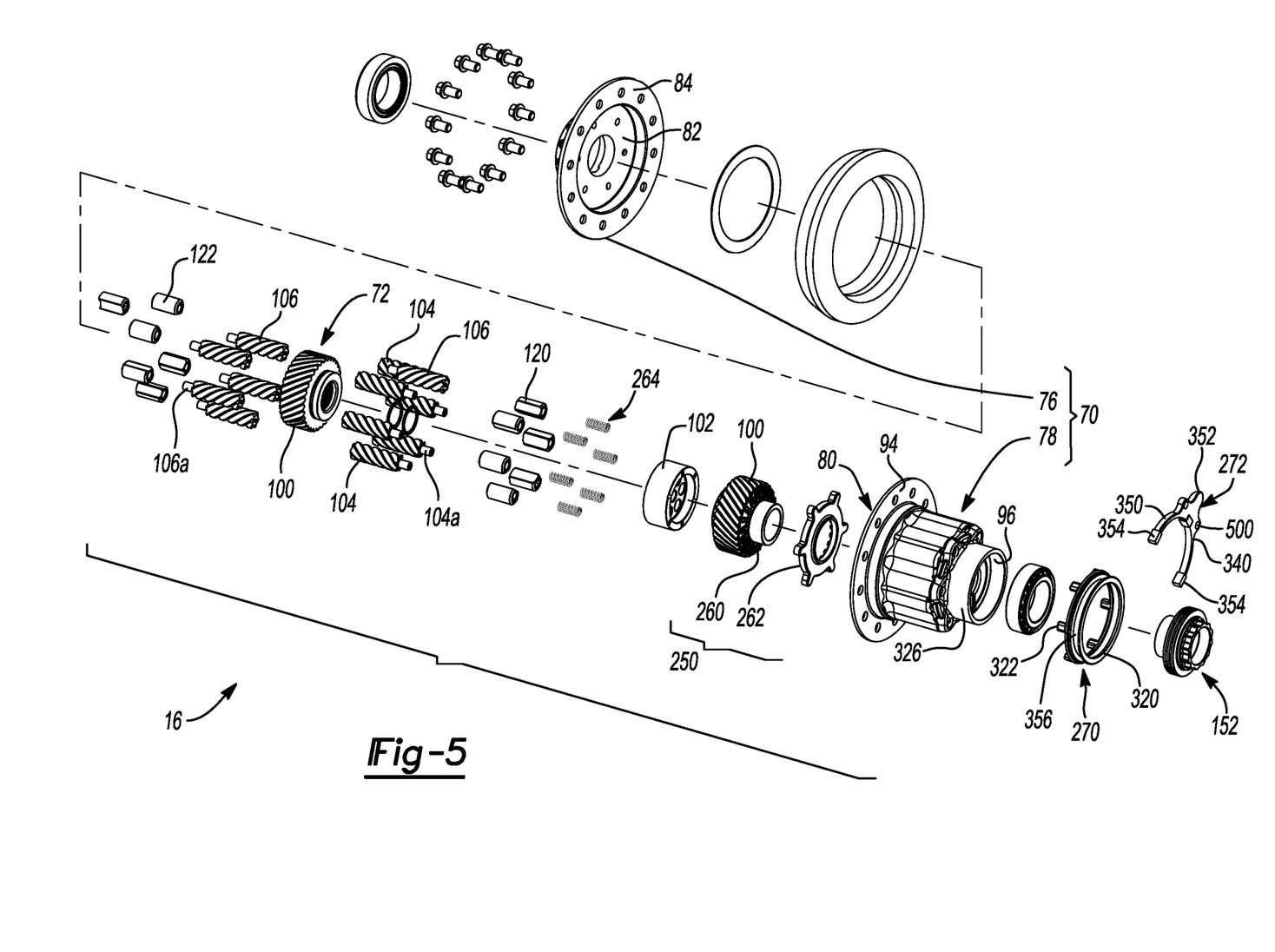
FIG. 5 is an exploded perspective view of a portion of the axle assembly of FIG. 1, illustrating a differential assembly in more detail.
Figure 6:
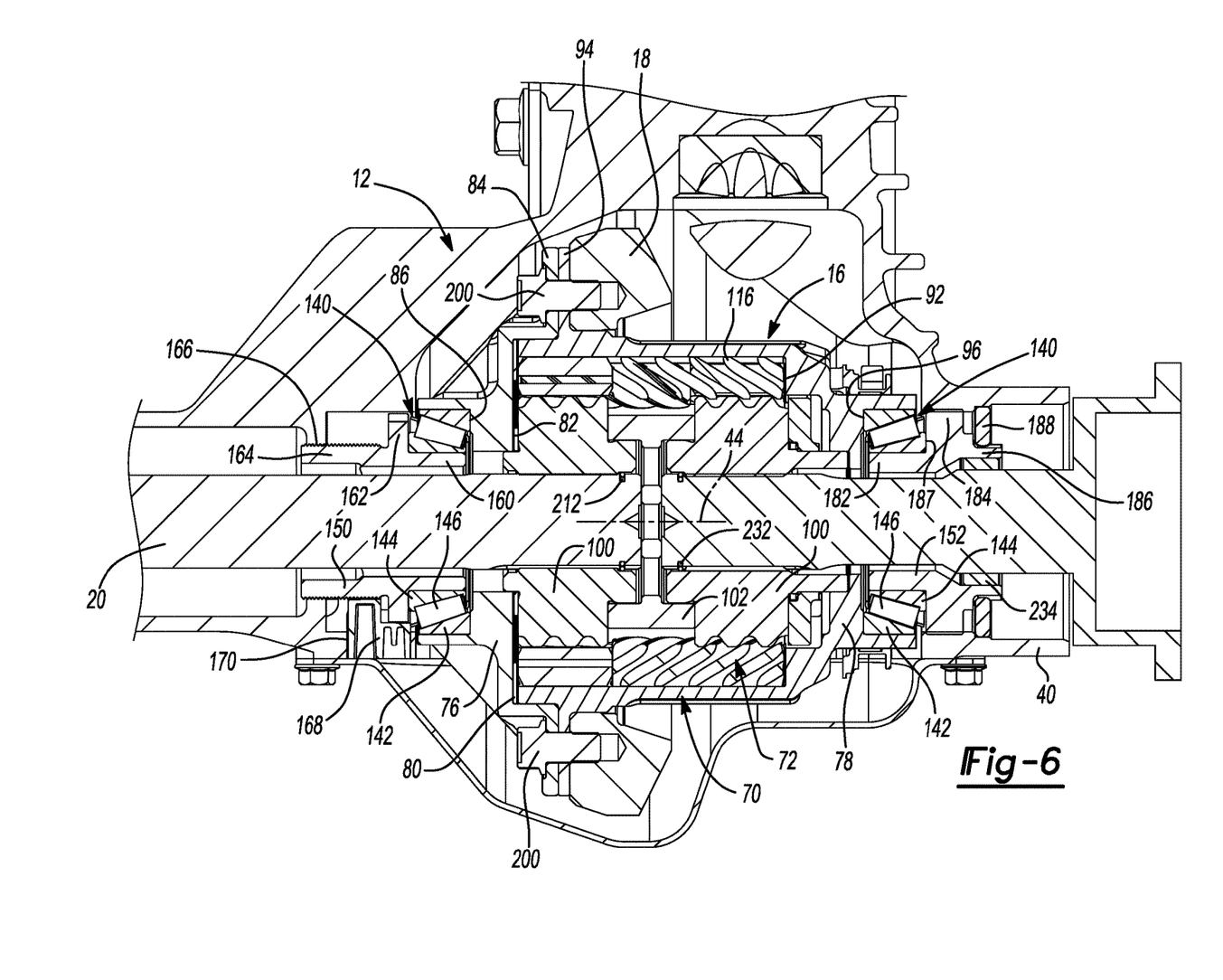
FIG. 6 is an enlarged portion of FIG. 3.

With reference to FIGS. 5 and 6, the differential assembly 16 can include a differential case 70 and a differential gearset 72. The differential case 70 can be formed in two discrete components that can be secured together in any manner desired, such as one or more welds or threaded fasteners. In the example provided, the differential case 70 comprises a cap structure 76 and a case structure 78 that can cooperate to define a gearset cavity 80. The cap structure 76 can define a first axial end 82 of the gearset cavity 80, a first radial flange member 84 and a first bearing bore 86. The case structure 78 can define a second axial end 92 of the gearset cavity 80, a second radial flange member 94 and a second bearing bore 96. The gearset cavity 80 is configured to receive the differential gearset 72. In the particular example provided, the differential gearset 72 is a helical gearset, having a pair of helical side gears 100, a spacer 102, a plurality of first helical pinions 104 and a plurality of second helical pinions 106. As such, the gearset cavity 80 of the particular example illustrated defines a central portion, which is configured to receive the pair of helical side gears 100 and the spacer 102, and a plurality of pinion bore sets (not specifically shown), each of which having a first pinion bore 114 (FIG. 7), which is configured to receive an associated one of the first helical pinions 104, and a second pinion bore 116 (FIG. 6) that is configured to receive an associated one of the second helical pinions 106. The pinion bore sets are spaced circumferentially about the central portion and are configured such that the first helical pinions 104 meshingly engage a first one of the helical side gears 100, the second helical pinions 106 meshingly engage a second one of the helical side gears 100, and each first helical pinion 104 in a given one of the pinion bore sets meshingly engages the corresponding second helical pinion 106 in the given one of the pinion bore sets. The spacer 102 can be configured to limit end play of the helical side gears 100 and/or to control friction acting on the helical side gears 100 when rotary power transmitted through the differential assembly 16 causes the helical side gears 100 to thrust toward one another.

With reference to FIGS. 5 through 8, the differential gearset 72 can further comprise a plurality of first brake shoes 120 and a plurality of second brake shoes 122. Each of the first brake shoes 120 can be received in an associated one of the first pinion bores 114 (FIG. 7) and can be mounted on a necked-down portion 104a formed on an associated one of the first helical pinions 104. The first brake shoes 120 can be generally hollow cylindrically shaped and can have two grooves 126, 128 formed on their exterior surfaces. A first one of the grooves 126 can be sized and shaped to engage the outer surface of a corresponding one of the second helical pinions 106, while a second one of the grooves 128 can be sized and shaped to engage the outer surface of the second one of the helical side gears 100. Similarly, each of the second brake shoes 122 can be received in an associated one of the second pinion bores 116 (FIG. 6) and can be mounted on a necked-down portion 106a formed on an associated one of the second helical pinions 106. The second brake shoes 122 can be generally hollow cylindrically shaped and can have two grooves 130, 132 formed on their exterior surfaces. A first one of the grooves 130 can be sized and shaped to engage the outer surface of a corresponding one of the first helical pinions 104, while a second one of the grooves 132 can be sized and shaped to engage the first one of the helical side gears 100.

With reference to FIGS. 5 and 6, bearings configured to handle radial and axial loads can be received into the first and second bearing bores 86 and 96 and can be employed to support the differential assembly 16 for rotation about the second axis 44 relative to the carrier structure 30. In the example provided, the bearings comprise tapered roller bearings 140 having an outer bearing race 142, an inner bearing race 144 and a plurality of tapered rolls 146 that are received between the outer and inner bearing races 142 and 144. The outer bearing races 142 are received into the first and second bearing bores 86 and 96 and engaged to the differential case 70 (i.e., to the cap structure 76 and the case structure 78 in the example provided). The bearing bores 86 and 96 are counterbored into the differential case 70 and as such, an axial end of each outer bearing race 142 is abutted against a shoulder formed by an associated one of the bearing bores 86 and 96. Each of the inner bearing races 144 can be supported on a part of the housing assembly 12. In the example provided, the inner bearing race 144 of the bearing that is received in the cap structure 76 is mounted directly to a first bearing adjuster 150, while the inner bearing race 144 of the bearing that is received in the case structure 78 is mounted directly to a second bearing adjuster 152.

In FIGS. 2 and 6, the first bearing adjuster 150 can include a bearing race mount 160, a shoulder 162 and a threaded portion 164 that is threadably received into a threaded portion 166 of the carrier portion 36 where the carrier portion 36 intersects the first axle tube portion 38 (i.e., the carrier portion 36 terminates in a lateral direction along the second axis 44 at the threaded portion 166 in the particular example provided). The inner bearing race 144 of the bearing that is received into the cap structure 76 is received on the bearing race mount 160 and abutted against the shoulder 162. A first adjuster lock 168 can be employed to inhibit rotation of the first bearing adjuster 150 relative to the carrier structure 30. In the example provided, the first adjuster lock 168 is received in an adjuster lock aperture 170 formed through the planar surface 48 of the cover flange 46 and features formed on the first adjuster lock 168 matingly engage notches 172 formed in the outer circumferential surface of the shoulder 162 to thereby inhibit rotation of the first bearing adjuster 150 relative to the carrier structure 30. The cover 32 is disposed over the first adjuster lock 168 when the cover 32 is fastened to the carrier structure 30 so as to limit movement of the first adjuster lock 168 in the adjuster lock aperture 170 in a direction away from the shoulder 162 of the first bearing adjuster 150 to as to inhibit disengagement of the first adjuster lock 168 from the first bearing adjuster 150.

The second bearing adjuster 152 can include a bearing race mount 182, a threaded portion 184, which is threadably received into a portion of the carrier portion 36 where the carrier portion 36 intersects the second axle tube portion 40, and an adjuster lock mount 186. The inner bearing race 144 of the bearing that is received into the case structure 78 is received on the bearing race mount 182 and abutted against a shoulder 187 (FIG. 6) that is formed between the bearing race mount 182 and the threaded portion 184. A second adjuster lock 188 can be employed to inhibit rotation of the second bearing adjuster 152 relative to the carrier structure 30. In the example provided, the second adjuster lock 188 is a washer-like structure that is press-fit into the second axle tube portion 40 and is received on the adjuster lock mount 186. The adjuster lock mount 186 can have a non-circular (e.g., polygonal, such as decagonal {10 sided} or dodecagonal {12 sided}) outer surface, while the second adjuster lock 188 can define a mating inner surface. Accordingly, receipt of the second adjuster lock 188 onto the adjuster lock mount 186 coupled with frictional engagement of second adjuster lock 188 to the carrier structure 30 inhibits rotation of the second bearing adjuster 152 relative to the carrier structure 30. It will be appreciated that the positions of the first and second bearing adjusters 150 and 152 relative to the carrier structure 30 can be coordinated to both preload the tapered roller bearings 140 to a desired level and/or to control the positioning of the ring gear 18 along the second axis 44 relative to the input pinion 14.

The ring gear 18 can be fixedly coupled to the differential case 70 in any desired manner and can be meshingly engaged with the input pinion 14. In the particular example provided, threaded fasteners 200 are received through holes formed in the first and second radial flange members 84 and 94 and are threadably engaged into threaded holes formed in the ring gear 18. The threaded fasteners 200 are tightened to abut the second radial flange member 94 to the first radial flange member 84 and the ring gear 18 and to apply a clamp load that secures the assembly together.

With reference to FIGS. 2 and 3, the first axle shaft 20 can be received into the first axle tube portion 38 and can be fixedly and non-rotatably coupled to the first one of the helical side gears 100. In the example provided, a proximal end 210 of the first axle shaft 20 is formed with male spline teeth that are matingly engaged to female spline teeth formed in the first one of the helical side gears 100 and a snap ring 212 (FIG. 6) is employed to resist axial movement of the first axle shaft 20 along the second axis 44 in a direction away from the first one of the helical side gears 100. A bearing 214 can support a distal end 216 of the first axle shaft 20 relative to the first axle tube portion 38. The second axle shaft 22 can be received into the second axle tube portion 40 and can be fixedly and non-rotatably coupled to the second one of the helical side gears 100. In the example provided, a proximal end 230 of the second axle shaft 22 is formed with male spline teeth that are matingly engaged to female spline teeth formed in the second one of the helical side gears 100 and a snap ring 232 (FIG. 6) is employed to resist axial movement of the second axle shaft 22 along the second axis 44 in a direction away from the second one of the helical side gears 100. A bearing 234, which can be disposed between the second bearing adjuster 152 and the second axle shaft 22, can support the second axle shaft 22 for rotation relative to the carrier structure 30.

Figure 7:
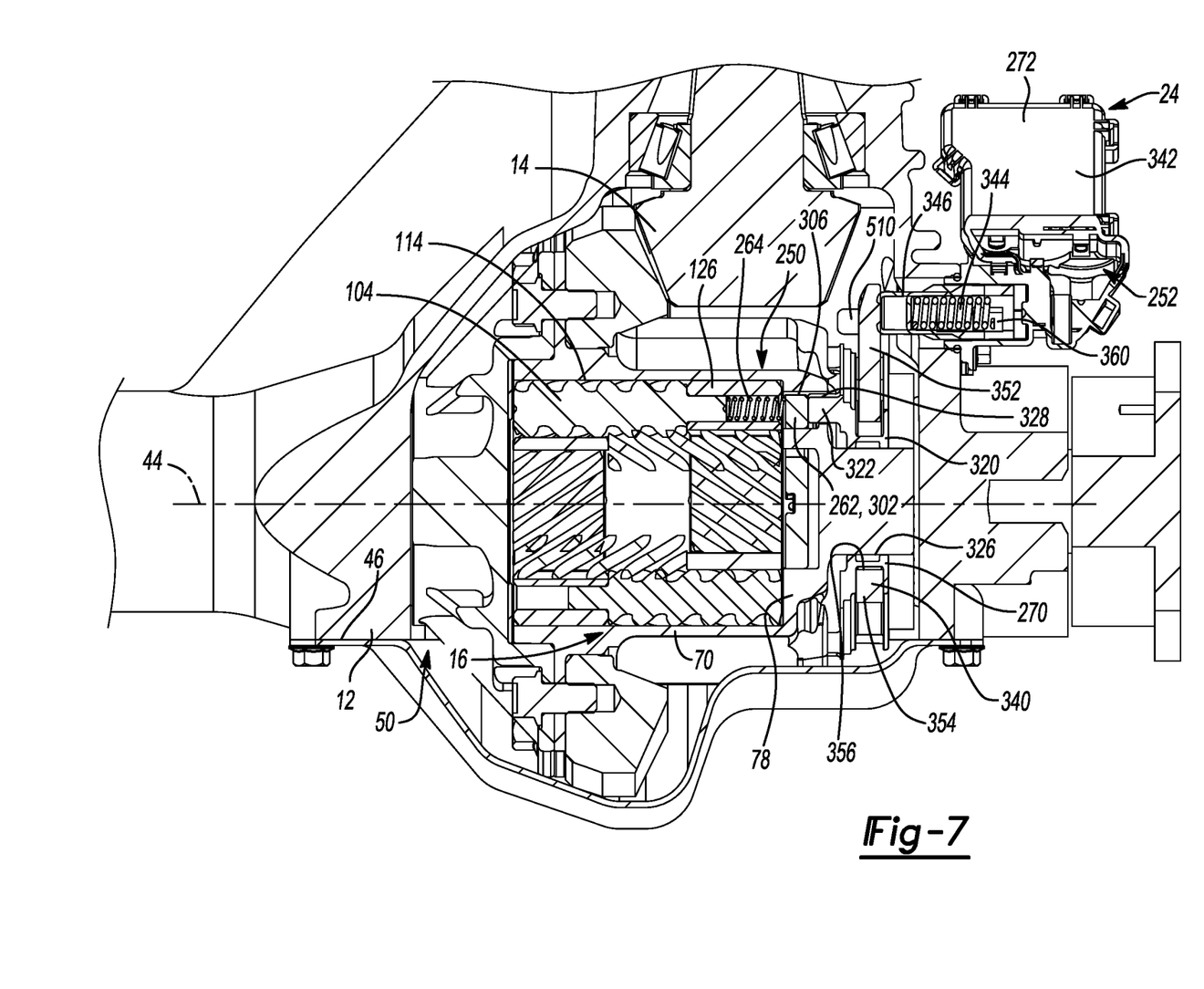
FIG. 7 is a section view taken parallel to a rotational axis of the differential assembly and illustrating a locking mechanism in more detail.
Figure 8:
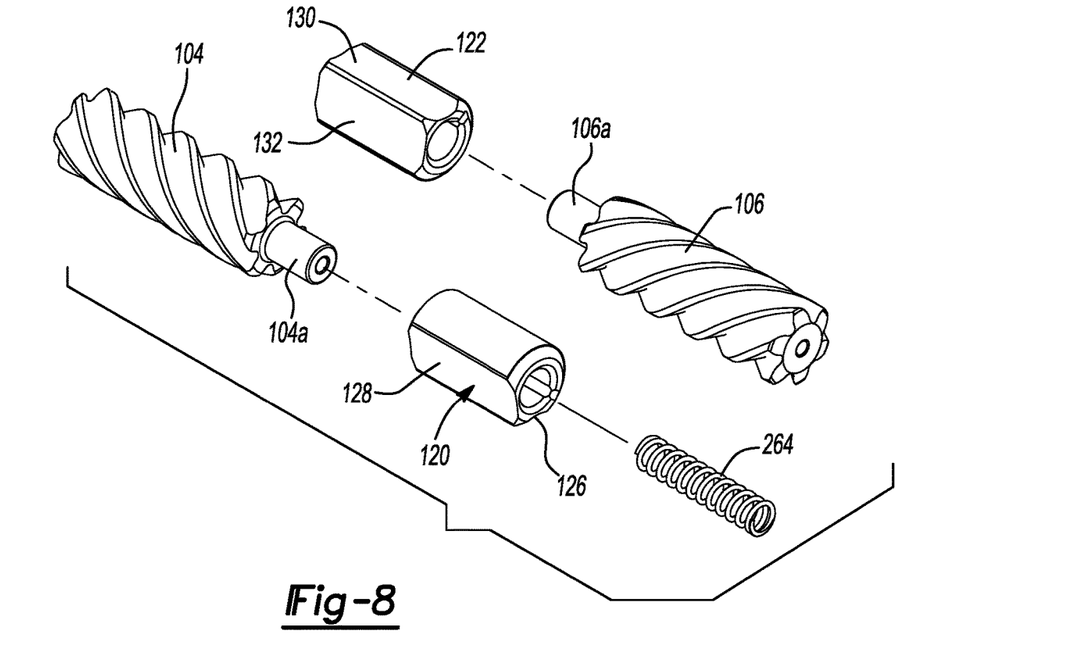
FIG. 8 is an exploded perspective view of a portion of the axle assembly of FIG. 1, illustrating a portion of the differential assembly in more detail.
Figure 9:
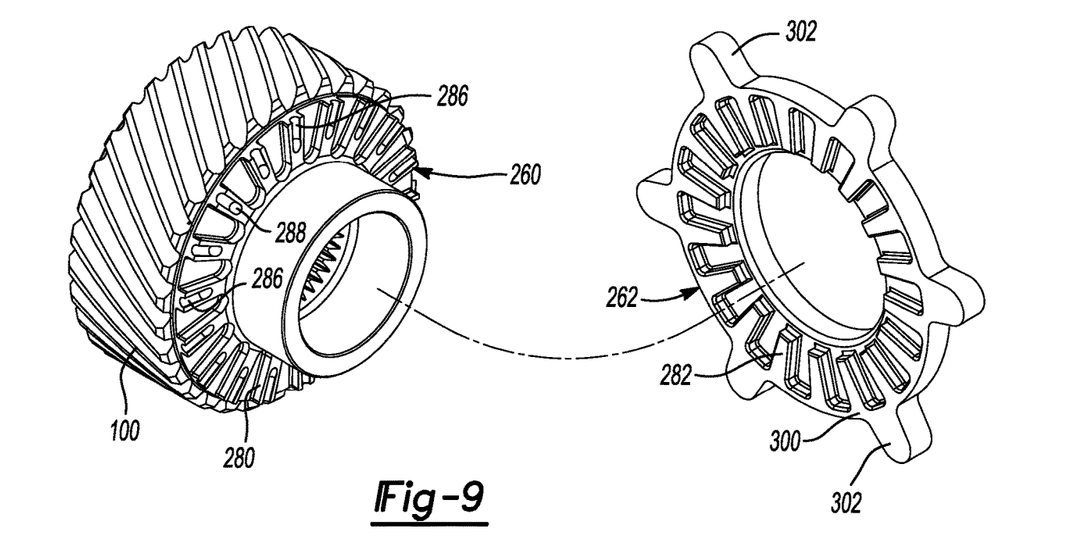
FIG. 9 is an exploded perspective view of the axle assembly of FIG. 1, illustrating a portion of the locking mechanism in more detail.

With reference to FIGS. 5, 7 and 9, the differential locking mechanism 24 can include a locking mechanism 250 and an actuating mechanism 252. The locking mechanism 250 can comprise a first clutch dog 260, a second clutch dog 262 and at least one return spring 264, while the actuating mechanism 252 can comprise an axially movable member 270 and an actuator 272. The first clutch dog 260 can be integrally formed with one of the helical side gears 100 (e.g., the second one of the helical side gears 100) and can comprise a plurality of face teeth 280. The second clutch dog 262 can be non-rotatably but axially slidably coupled to the differential case 70 and can have a plurality of face teeth 282 that are configured to engage the face teeth 280 on the first clutch dog 260. The face teeth 280 and 282 on the first and second clutch dogs 260 and 262 can be configured in any desired manner. As best shown in FIG. 9, the face teeth 280 of the first clutch dog 260 are configured with a feature that is configured to reduce stress at the root of the face teeth 280. The feature comprises a plurality of grooves 286, with each groove 286 being formed centrally (in a circumferential direction) in an associated one of the face teeth 280. The grooves 286 can extend from a radially inward point 288 radially outward through the circumferential end of the face teeth 280. The grooves 286 can be formed with a cutting tool having an end that is defined by a spherical radius (e.g., a ball mill). Alternatively, (positive) features for forming the grooves 286 can be formed into a forging die that can be employed to form the (negative) features, i.e., the grooves 286, during the manufacture of the helical side gear 100.

In FIGS. 7 and 9, the second clutch dog 262 of the particular example provided has an annular body 300 and a plurality of circumferentially spaced-apart tabs 302 that extend radially outwardly from the annular body 300. Each of the tabs 302 is configured to be received in a tab recess 306 formed in the case structure 78. Each tab recess 306 can be disposed in-line with an associated one of the first pinion bores 114. Engagement of the tabs 302 to the surfaces of the tab recesses 306 inhibits rotation of the second clutch dog 262 relative to the case structure 78 but permits axial sliding movement of the second clutch dog 262 along the second axis 44 relative to the case structure 78. The at least one return spring 264 can be configured to bias the second clutch dog 262 along the second axis 44 in a direction away from the first clutch dog 260. The return spring 264 could comprise one or more springs that can be disposed along the second axis 44 between the first and second clutch dogs 260 and 262. In the example provided, the return spring 264 comprises a plurality of helical compression springs, each of which being received in an associated one of the first brake shoes 120 and engaging an end of an associated one of the first helical pinions 104 and an associated one of the tabs 302.

In FIGS. 5 and 7, the axially movable member 270 can be an annular structure that can include a body 320 and a plurality of legs 322 that extend axially from the body 320. The body 320 can be an annular structure that can be mounted on a trunnion 326 formed by the case structure 78. The legs 322 can be received through apertures 328 in the differential case 70; each of the apertures 328 can intersect an associated one of the tab recesses 306 so that each of the tabs 302 is abutted against an axial end face of an associated one of the legs 322. In the example illustrated, the axially movable member 270 is unitarily formed from a metal material, such as steel, but it will be appreciated that a portion of the axially movable member 270, such as all or part of the body 320, could be formed from a suitable first material, such as steel, and a remaining portion of the axially movable member 270, such as all or part of the legs 322, could be formed from a second material, such as plastic, brass, bronze or steel, that can be fixedly coupled to the body 320 in any suitable manner (e.g., threaded fasteners, rivets, snap-fit connection, overmolding, welding, swaging).

The actuator 272 can be any type of actuator that is configured to translate the axially movable member 270 on the differential case along the second axis 44. In the example provided, the actuator 272 comprises a clutch fork 340, a linear motor 342, a compliance spring 344 and a plunger 346. The clutch fork 340 can have a generally U-shaped portion 350 and a plunger tab 352 that can extend outwardly and away from the U-shaped portion 350. The U-shaped portion 350 can have a pair of fork members 354 that can be received into an annular fork groove 356 formed in the outer circumferential surface of the axially movable member 270. The linear motor 342 has a motor output member 360 and can be any type of mechanism that is configured to translate the motor output member 360 along an axis that can be generally parallel to the second axis 44. The plunger 346 can be disposed in-line (e.g., coaxially) with the motor output member 360 and can be abutted against the plunger tab 352. The compliance spring 344 can be a helical coil compression spring that can be disposed between the motor output member 360 and the plunger 346. Operation of the linear motor 342 can cause corresponding translation of the motor output member 360, which can be transmitted to the plunger 346 via the compliance spring 344. It will be appreciated that movement of the plunger 346 in a first axial direction (i.e., toward the input pinion 14 in the example provided) will urge the axially movable member 270 (and the second clutch dog 262) along the second axis 44 toward the first clutch dog 260 and against a biasing force provided by the return spring 264. In a situation where the teeth 282 (FIG. 9) of the second clutch dog 262 cannot engage to the teeth 280 (FIG. 9) of the first clutch dog 260, movement of the second clutch dog 262, the axially movable member 270, the clutch fork 340 and the plunger 346 in the first axial direction will be arrested. The compliance spring 344, however, permits the motor output member 360 to continue to move in the first axial direction to complete its operation and apply a preload force to the plunger 346 that exceeds the force that is applied to the second clutch dog 262 by the return spring 264. Thereafter, when the teeth 282 (FIG. 9) of the second clutch dog 262 are able to engage the teeth 280 (FIG. 9) of the first clutch dog 260, the preload force applied by the compliance spring 344 can cause the plunger 346, as well as the clutch fork 340, the axially movable member 270 and the second clutch dog 262 to move in the first axial direction so that the teeth 282 (FIG. 9) of the second clutch dog 262 are driven into engagement with the teeth 280 (FIG. 9) of the first clutch dog 260. In this condition, the second one of the helical side gears 100 is locked to the differential case 70 for common rotation and as such, speed differentiation between the helical side gears 100 is not permissible (i.e., the differential assembly 16 is locked). Operation of the linear motor 342 to drive the motor output member 360 in a second axial direction opposite the first axial direction permits the return spring 264 to urge the second clutch dog 262, the axially movable member 270 and the plunger 346 in the second axial direction so that the teeth 282 (FIG. 9) of the second clutch dog 262 disengage the teeth 280 (FIG. 9) of the first clutch dog 260 so that the second one of the helical side gears 100 can rotate relative to the differential case 70. In this condition, speed differentiation between the helical side gears 100 is permitted (i.e., the differential assembly 16 is open).

Figure 10:
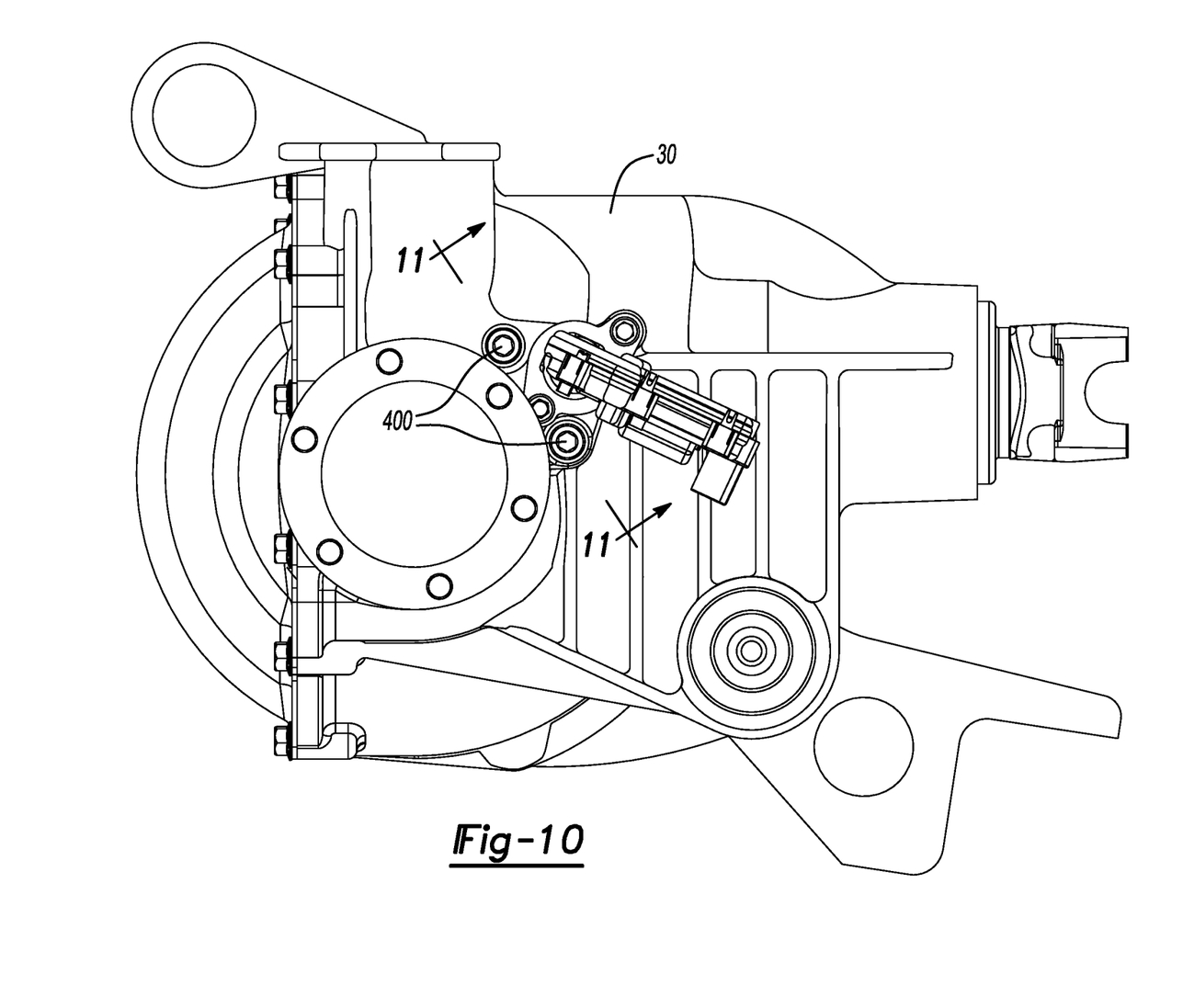
FIG. 10 is a side elevation view of the axle assembly of FIG. 1.
Figure 11:
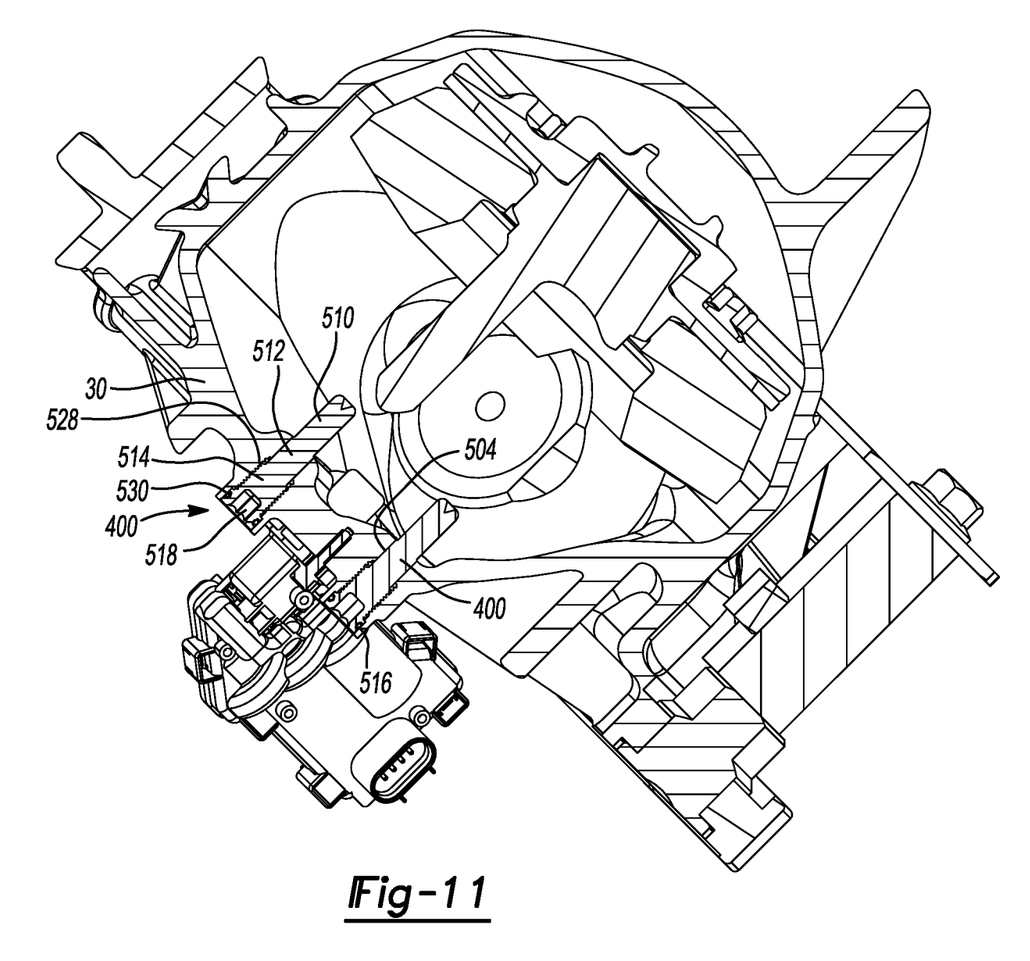
FIG. 11 is a section view taken along the line 11-11 of FIG. 10.

In the example provided, the axially movable member 270 and the clutch fork 340 are assembled to the differential assembly 16 prior to the installation of the differential assembly 16 to the housing assembly 12. In this regard, the differential assembly 16 is inserted through the cover flange 46 into the cavity 50 in the carrier structure 30 and rotated to generally align the plunger tab 352 on the clutch fork 340 into a position that is generally aligned to the location of the plunger 346 (when the remainder of the actuator 272 is installed to the carrier structure 30). Moreover, spring forces from the return spring 264 and the compliance spring 344 merely cause the plunger 346 to abut the clutch fork 340; there is no fixed connection between the plunger 346 and the clutch fork 340. Accordingly, it may be advantageous in some situations to provide one or more guides that prevent the clutch fork 340 from rotating about the second axis 44 or pivoting (twisting) about an axis that is perpendicular to the second axis 44. To this end, and with reference to FIGS. 7, 10 and 11, one or more pins (i.e., guide pins) 400 can be assembled to the carrier structure 30 to align the plunger tab 352 on the clutch fork 340 to the second axis 44. In the particular example provided, each of the pins 400 is slip fit into a pin bore 500 (FIG. 5) formed in the U-shaped portion 350 (FIG. 5) of the clutch fork 340 and is engaged in slip fit manner to an alignment bore 504 (FIG. 11) formed in the carrier structure 30. The pins 400 can be retained to the carrier structure 30 in any desired manner. In the example provided, each of the pins 400 comprises fork piloting portion 510, a carrier structure alignment portion 512, a threaded portion 514, a seal portion 516 and a drive feature 518. The fork piloting portion 510 can be a cylindrically-shaped structure having a rounded or tapered end that is configured to aid an assembly technician to align the pin bores 500 (FIG. 5) to the fork piloting portions 510 during the installation of the pins 400. The pins 400 are configured to permit engagement of the fork piloting portions 510 to the pin bores 500 (FIG. 5) prior to engagement of the carrier structure alignment portions 512 to the alignment bores 504 in the carrier structure 30. The carrier structure alignment portions 512 and the alignment bores 504 are sized in a manner that aligns the pins 400 in a desired manner parallel to the second axis 44 (FIG. 7). The threaded portion 514 on each of the pins 400 can be threadably engaged to a threaded hole 528 that is joined to or intersects an associated one of the alignment bores 504. The threaded portion 514 can be configured (e.g., with a head of some sort) to create a clamping force that retains or locks the threaded portion 514 to the carrier structure 30. Additionally or alternatively, an adhesive, such as a Loctite® material, could be employed between the threaded portion 514 and the threaded hole 528 to inhibit rotation of the pin 400 relative to the carrier structure 30. The seal portion 516 can be configured to form a seal between the pin 400 and the carrier structure 30 to prevent fluids from entering or exiting the carrier structure 30 through any portion of the aperture in the carrier structure 30 through which the pin 400 extends. In the example provided, the seal portion 516 comprises a groove, which is formed in the outer circumferential surface on a head of the pin 400, and an O-ring that is received in the groove. The O-ring sealingly engages the head of the pin 400 and the surface of a counterbore 530 in the carrier structure 30 in which the head is received. The drive feature 518 can have any desired shape or configuration that permits the pin 400 to be installed to the carrier structure 30. In the example provided, the drive feature 518 is an internal hex bore that can be formed via cold heading or broaching during the manufacture of the pin 400. The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An axle assembly comprising:
    an axle housing;
    a locking differential assembly received in the axle housing, the locking differential assembly having a differential input member, first and second differential output members, first and second clutch dogs, at least one return spring, a movable member, a clutch fork and a linear motor, the differential input member and the first and second differential output members being rotatable about a rotary axis, the first clutch dog being coupled to the second differential output member for rotation therewith, the second clutch dog being non-rotatably but axially slidably coupled to the differential input member, the second clutch dog being movable between a first position, in which the first and second clutch dogs are engaged to one another to thereby inhibit relative rotation between the differential input member and the second differential output member, and a second position in which the first and second clutch dogs are disengaged from one another to thereby permit relative rotation between the differential input member and the second differential output member, the at least one return spring biasing the second clutch dog toward the second position, the movable member defining a clutch fork groove and being movable between a third position, which physically positions the second clutch dog in the first position, and a fourth position, which permits the second clutch dog to be moved by the at least one return spring into the second position, a clutch fork received in the clutch fork groove and pivotable about the rotary axis, the linear motor being coupled to the axle housing and having a motor output member that engages the clutch fork but which is not fixedly coupled to the clutch fork; and
    at least one guide pin coupled to the axle housing and engaging the clutch fork, the at least one guide pin being configured to guide the clutch fork along a desired path of movement that is parallel to the rotary axis.

2. The axle assembly of claim 1, wherein the at least one guide pin is threadably coupled to the axle housing.

3. The axle assembly of claim 1, wherein the at least one guide pin comprises first and second guide pins that are disposed along guide pin axes that are parallel to the desired path of movement and wherein the motor output member of the linear motor contacts the clutch fork at a location that is disposed between the guide pin axes.

4. The axle assembly of claim 1, wherein the linear motor comprises a compliance spring and an intermediate output member and wherein the compliance spring permits movement of the intermediate output member relative to the motor output member.

5. A front axle assembly comprising:
an axle housing;
a locking differential assembly received in the axle housing, the locking differential assembly having a differential case, a helical gearset, which is received in the differential case, and first and second clutch dogs, the differential case defining a plurality of pinion bores, the helical gearset having first and second helical side gears and a plurality of pinion sets, each of the pinion sets being received in an associated one of the pinion bores and having a first helical pinion, which is meshingly engaged to the first helical side gear, and a second helical pinion that is meshingly engaged with the second helical side gear, the first and second helical pinions of each pinion set being meshingly engaged to one another, the first clutch dog being coupled to the second helical side gear for rotation therewith, the second clutch dog being non-rotatably but axially movably coupled to the differential case, the second clutch dog being movable between a first position, in which the first and second clutch dogs are engaged to one another to thereby inhibit relative rotation between the second helical side gear and the differential case, and a second position in which the second clutch dog is disengaged from the first clutch dog to thereby permit relative rotation between the second helical side gear and the differential case; and
an electrically operated linear motor coupled to the axle housing, the linear motor having a motor output member that is selectively movable to urge the second clutch dog toward the first position.

6. An axle assembly comprising:
a housing; and
a locking differential assembly having a differential case, a helical gearset and a locking mechanism, the differential case being mounted in the housing for rotation about an axis and defining a plurality of pinion bores, the helical gearset comprising first and second helical side gears and a plurality helical pinions, the first and second helical side gears being rotatable about the axis, the helical pinions being received in the pinion bores and transmitting rotary power between the differential case and the first and second helical side gears, the locking mechanism having first and second clutch dogs and a plurality of return springs, the first clutch dog being fixed to the first helical side gear for rotation therewith, the second clutch dog being non-rotatably but axially slidably coupled to the differential case and movable between a first position, in which the first and second clutch dogs are engaged to one another to inhibit relative rotation between the first helical side gear and the differential case, and a second position in which the first and second clutch dogs are separated axially along the axis to permit relative rotation between the first helical side gear and the differential case, each of the return springs being received in the differential case and disposed between the second clutch dog and an associated one of the helical pinions, the return springs cooperating to bias the second clutch dog toward the second position.

7. The axle assembly of claim 6, wherein the helical pinions comprise a plurality of pinion gear sets, each of the pinion bores housing an associated one of the pinion gear sets, each of the pinion gear sets comprising a first helical pinion, which is meshingly engaged to the first helical side gear, and a second helical pinion that is meshingly engaged to the second helical side gear, the first and second helical pinions of each pinion gear set being meshingly engaged, and wherein the return springs are disposed between the second clutch dog and the first helical pinions.

8. The axle assembly of claim 7, wherein each of the second helical pinions comprises a gear member and a brake shoe, the brake shoe being received in an associated one of the pinion bores and being mounted on the gear member.

9. The axle assembly of claim 8, wherein each of the return springs is received through an associated one of the brake shoes.

10. The axle assembly of claim 7, wherein the first clutch dog defines a plurality of teeth that are spaced circumferentially apart about the axis, and wherein each of the teeth has a root and is formed with a feature that is configured to reduce stress at the root.

11. The axle assembly of claim 10, wherein the feature comprises a groove that is formed centrally on an associated one of the teeth in a circumferential direction, the groove extending from a radially inward point on the associated one of the teeth and through an outer circumferential end of the associated one of the teeth.

12. A method for assembling an axle assembly, the method comprising:
providing an axle housing that defines a differential cavity and an aperture that intersects the differential cavity;
securing a linear motor to the axle housing to close the aperture, the linear motor having a motor output member;
installing a locking differential assembly into the differential cavity, the locking differential assembly having a differential input member, first and second differential output members, first and second clutch dogs, at least one return spring, a movable member and a clutch fork, the differential input member and the first and second differential output members being rotatable about a rotary axis, the first clutch dog being coupled to the second differential output member for rotation therewith, the second clutch dog being non-rotatably but axially slidably coupled to the differential input member, the second clutch dog being movable between a first position, in which the first and second clutch dogs are engaged to one another to thereby inhibit relative rotation between the differential input member and the second differential output member, and a second position in which the first and second clutch dogs are disengaged from one another to thereby permit relative rotation between the differential input member and the second differential output member, the at least one return spring biasing the second clutch dog toward the second position, the movable member defining a clutch fork groove and being movable between a third position, which physically positions the second clutch dog in the first position, and a fourth position, which permits the second clutch dog to be moved by the at least one return spring into the second position, the clutch fork being received in the clutch fork groove such that the clutch fork is pivotable about the rotary axis, the clutch fork abutting but not being fixedly coupled to the movable member; and installing at least one guide pin to the axle housing, the at least one guide pin engaging the clutch fork and being configured to guide the clutch fork along a desired path of movement that is parallel to the rotary axis.

13. The method of claim 12, wherein the at least one guide pin comprises first and second guide pins that are disposed along guide pin axes that are parallel to the desired path of movement and wherein the motor output member of the linear motor contacts the clutch fork at a location that is disposed between the guide pin axes.

* * * * *